United States Patent [19]
Klayder et al.

[11] Patent Number: 6,013,323
[45] Date of Patent: Jan. 11, 2000

[54] SILICONE GEL WAXES AND SILICONE GEL PROTECTANTS

[76] Inventors: Donna W. Klayder, 2142 Blenheim Ave., Alliance, Ohio 44601; David A. Lupyan, 10216 Widgeon Dr., Chagrin Falls, Ohio 44023

[21] Appl. No.: 09/183,822

[22] Filed: Oct. 30, 1998

[51] Int. Cl.⁷ .............................. B05D 3/00; B05D 7/02; B05D 7/12; B05D 7/14; B05D 7/24
[52] U.S. Cl. .................... 427/384; 427/155; 427/156; 427/387; 427/407.1; 427/409; 427/412; 427/412.1; 106/3; 252/8.57; 252/8.81; 252/8.91; 510/403; 510/466; 510/476
[58] Field of Search .................. 106/3, 2, 287.1, 106/287.16; 424/70.11, 70.121, 70.122; 252/8.57, 8.81, 8.91; 427/387, 384, 154, 155, 156, 409; 510/466, 403, 476, 501, 528

[56] References Cited

U.S. PATENT DOCUMENTS

| | | |
|---|---|---|
| 2,071,365 | 2/1937 | Stroop . |
| 2,523,281 | 9/1950 | Currie ......................................... 106/3 |
| 2,584,413 | 2/1952 | Baer et al. . |
| 2,703,288 | 3/1955 | Worson . |
| 3,088,158 | 5/1963 | Boyle et al. . |
| 3,306,869 | 2/1967 | Lahr et al. . |
| 3,331,801 | 7/1967 | Osmond et al. . |
| 3,378,513 | 4/1968 | Witwer . |
| 3,518,099 | 6/1970 | Holbus . |
| 3,562,786 | 2/1971 | Bailey et al. . |
| 3,702,836 | 11/1972 | Walbridge . |
| 3,786,012 | 1/1974 | Marion et al. . |
| 3,806,474 | 4/1974 | Blair . |
| 3,847,622 | 11/1974 | Brandl et al. .............................. 106/10 |
| 3,929,492 | 12/1975 | Chapman et al. ........................... 106/3 |
| 4,005,028 | 1/1977 | Heckert et al. ............................ 252/99 |
| 4,013,475 | 3/1977 | Leibowitz et al. ........................ 106/10 |
| 4,218,250 | 8/1980 | Kasprzak ..................................... 106/3 |
| 4,247,330 | 1/1981 | Sanders, Jr. ................................. 106/3 |
| 4,284,668 | 8/1981 | Nixon ...................................... 427/355 |
| 4,287,080 | 9/1981 | Siklosi ..................................... 252/104 |
| 4,311,695 | 1/1982 | Starch ...................................... 424/184 |
| 4,347,333 | 8/1982 | Lohr et al. ............................... 524/269 |
| 4,439,343 | 3/1984 | Albanese ................................. 252/305 |
| 4,497,919 | 2/1985 | Varga et al. ............................... 524/10 |
| 4,592,934 | 6/1986 | Wolstoncroft ........................... 427/355 |
| 4,600,436 | 7/1986 | Traver et al. ............................... 106/3 |
| 4,613,646 | 9/1986 | Sandvick ................................. 524/476 |
| 4,673,703 | 6/1987 | Bromley et al. ......................... 524/504 |
| 4,703,077 | 10/1987 | Webb ...................................... 524/462 |
| 4,732,612 | 3/1988 | Steer et al. ................................ 106/10 |
| 4,737,537 | 4/1988 | Schwabe et al. ......................... 524/474 |
| 4,743,648 | 5/1988 | Hill et al. ................................. 524/731 |
| 4,782,095 | 11/1988 | Gum ........................................ 514/937 |
| 4,790,877 | 12/1988 | Vadasz ........................................ 106/3 |
| 4,927,667 | 5/1990 | Shih et al. ............................... 427/154 |
| 4,952,248 | 8/1990 | Aberg ........................................ 134/40 |
| 4,997,478 | 3/1991 | Gordon ....................................... 106/3 |
| 5,017,222 | 5/1991 | Cifuentes et al. ........................ 106/10 |
| 5,085,695 | 2/1992 | Randen et al. .............................. 106/8 |
| 5,104,643 | 4/1992 | Grollier et al. ............................ 424/47 |
| 5,174,813 | 12/1992 | Cifuentes et al. .......................... 106/3 |
| 5,288,314 | 2/1994 | Howard et al. ............................. 106/3 |
| 5,330,787 | 7/1994 | Berlin et al. ............................. 427/154 |
| 5,494,611 | 2/1996 | Howe ...................................... 252/548 |
| 5,531,814 | 7/1996 | Bahr et al. .................................. 106/3 |
| 5,534,198 | 7/1996 | Masters et al. .......................... 510/182 |
| 5,556,833 | 9/1996 | Howe ...................................... 510/189 |
| 5,565,516 | 10/1996 | Fausnight et al. ....................... 524/556 |
| 5,700,312 | 12/1997 | Fausnight et al. ........................ 106/10 |
| 5,753,607 | 5/1998 | Burke et al. ................................ 106/2 |
| 5,759,980 | 6/1998 | Russo et al. ............................. 510/241 |
| 5,866,532 | 3/1999 | Jackson et al. ............................. 106/3 |
| 5,925,607 | 7/1999 | Flanagan ................................. 510/242 |

FOREIGN PATENT DOCUMENTS

| | | |
|---|---|---|
| 2 231 731 | 12/1974 | France . |
| 2 401 972 | 3/1979 | France . |
| 955975 | 4/1964 | United Kingdom . |
| WO 96/34933 | 11/1996 | WIPO . |

OTHER PUBLICATIONS

Declaration of David A. Lupyan Pursuant to Rule 56, signed on Apr. 29, 1999 by David Lupyan.

Silwet Surfactants, OSI Specialties, Product Lieterature, 1994 (no month).

Flourad, Fluorochemical Surfactants, 3M Product Literature, 1993 (no month).

Zonyl Flouorsurfactants, DuPont Specialty Chemicals Product Literature, Aug. 1993.

Ganex V Polymers, GAF Corporation, 1998 (no month).

*Primary Examiner*—Diana Dudash

[57] ABSTRACT

The present invention relates to an aqueous based, gelled silicone compositions, more particularly waxes and protectants, which are substantially free of volatile organic solvents. The silicone gel wax is useful for protecting a variety of painted surfaces, particularly painted metal surfaces such as car exteriors. The silicone gel protectant is useful for protecting and enhancing the appearance of vinyl, leather, rubber and plastic surfaces such as found in car interiors, car trim and car bumpers.

26 Claims, No Drawings

SILICONE GEL WAXES AND SILICONE GEL PROTECTANTS

BACKGROUND OF THE INVENTION

Silicone waxes and silicone protectants, particularly those used to polish and or protect automobiles, are liquid or paste compositions that conventionally contain volatile organic solvents such as mineral spirits. Typically, such wax compositions contain about 25–35% volatile organic solvents; indeed, some formulations contain up to about 40% volatile organic solvents. Such volatile organic solvents are not environmentally friendly.

It would be desirable to have silicone wax products and silicone protectants which do not contain volatile organic solvents, yet which are easily applied to both horizontal and vertical surfaces.

SUMMARY OF THE INVENTION

The present invention relates to an aqueous based, gelled silicone compositions, more particularly waxes and protectants, which are substantially free of volatile organic solvents. The silicone gel wax is useful for protecting a variety of painted surfaces, particularly painted metal surfaces such as car exteriors. The silicone gel protectant is useful for protecting and enhancing the appearance of vinyl, leather, rubber and plastic surfaces such as found in car interiors, car trim and car bumpers.

DETAILED DESCRIPTION OF INVENTION

Conventionally, water based system are not compatible with silicone amine functional groups or silicone fluids; when water is mixed with silicone amine functional groups or silicone fluids the resulting composition is cloudy. Surprisingly, the preferred embodiments of the present invention are not cloudy; instead they are transparent.

The Silicone Gel Wax

The silicone gel wax has a viscosity of at least 3000 centipoise, preferably at least about 5000 centipoise, more preferably from about 5,000 to about 120,000 centipoise, most preferably from about 50,000 to about 60,000 centipoise. In the preferred embodiment, the silicone gel wax is clear, that is, transparent. The silicone gel wax is water based; preferably it has less than 10% volatile organic solvents, more preferably less than 5%, most preferably less than about 1%. The silicone gel wax is preferably not an emulsion.

The silicone gel wax comprises: from about 25% to about 80%, preferably about 25% to 50%, more preferably from about 30% to about 38% water;

from about 0.01% to about 15%, preferably from 0.1% to 8%, more preferably from 0.5% to 3 of an amino functional silicone;

from about 0.05% to about 3%, preferably from about 0.1% to about 1%, most preferably from about 0.2% to about 0.5% of a acrylate thickener, from about 0.01% to about 20%, preferably from about 0.1% to about 15%, more preferably from about 2% to about 12% silicone fluid;

from 0% to about 80%, preferably from about 0.01% to about 80%, more preferably from about 10% to about 70%, even more preferably from about 25 to about 65%, most preferably from about 45% to about 62%, humectant;

from 0% to about 25%, preferably from 0.01% to about 25%, more preferably from 0.05% to about 8%, most preferably from 0.1% to about 3%, silicone surfactant;

and from 0% to about 10%, preferably from about 0.001% to about 10%, more preferably 0.005% to about 3% fluoropolymer.

Where the acrylate thickener is in acid form, a neutralizer is preferably employed in an amount sufficient to provide the silicone gel wax with a pH of from about 6.5 to about 7. Good results have been obtained employing neutralizer in an amount from about 0.075% to about 0.75%. Preferably the humectant and the water are present in a ratio of from about 1:10 to 10:1, more preferably from about 2.5:1 to 0.5:1, most preferably about a 1.6:1 ratio. Preferably the acrylate thickener and neutralizing agent are present in a one to one ratio. The silicone gel wax is useful to polish a variety of surfaces, particularly painted metal surfaces such as automobile exteriors.

The Silicone Gel Protectant

The silicone gel protectant protects and enhances the appearance of surfaces of materials such as plastics, vinyl, leather, rubber and the like, particularly those materials such as found in car interiors.

The silicone gel protectant comprises: from about 0.01% to about 20%, preferably from about 0.1 to about 15%, more preferably from about 5% to about 12% silicone fluid;

from about 0.01% to about 15%, preferably from about 0.05% to about 10%, more preferably from about 0.1% to about 1%, thickener;

from about 20% to about 80%, from about 25% to about 65%, more preferably from about 30% to about 45% water;

from 0% to about 20%, preferably from 0.01% to about 20%, more preferably from 0.05% to about 10%, most preferably from 0.1% to about 3% silicone surfactant;

from 0% to about 80%, preferably from 0.1% to about 80%, more preferably from 10% to about 70%, even more preferably from 25% to about 65%, most preferably from about 45% to about 62% humectant;

and from 0% to about 10%, preferably from about 0.001% to about 10%, more preferably 0.005% to about 3% fluoropolymer.

The fluoropolymer imparts slip, longevity, and durability to the silicone gel protectant.

In the preferred embodiment, the silicone gel protectant also contains from about 0.01% to about 6%, more preferably from about 0.1% to about 0.3% silicone "beads".

The silicone gel protectant has a viscosity of preferably at least 1000 centipoise, preferably at least 5000, preferably from about 1000 to about 20,000 centipoise, more preferably from about 5000 to about 7000 centipoise, most preferably from about 3500 to about 4500 centipoise.

THE COMPONENTS

The Thickener

The term "thickener" encompasses both the acrylate thickener and the polymeric thickener.

The Acrylate Thickener

An acrylate thickener is employed in the silicone gel wax and preferably the silicone gel protectant. The acrylate thickener is preferably an acrylic-acrylate preferably in acid form and preferably has a equivalent weight of from about 62 to about 110, more preferably from about 72 to about 80, most preferably from about 75 to 77. The weight average molecular weight, in water is preferably greater than about 400,000 preferably greater than about 500,000. The acrylate thickener is preferably water soluble. The acrylate thickener is a suspending and stabilizing agent that is soluble in water and polar solvents. The acrylate thickener swells in water; it is a crosslinked polymer which thickens when neutralized a polyacrylic acid polymer. Suitable acrylate thickeners are, conventionally known as "carbopols" and are commercially available under the tradename such as, Carbamer 940, Carbamer 2623, Carbamer EZ1, Carbamer EZ2, and PEMULAN 1622 from the B.F. Goodrich Company. The preferred acrylate thickener is a polyacrylic acid homopolymer also known as carboxypolymethylene, and is commercially available under the trade name Carbamer 940 from B.F. Goodrich Company. The acrylate thickener imparts a suitable viscosity to the formulation so that it does not run or drip, particularly from the vertical surfaces.

Where the acrylate thickener is in an acid form, a neutralizing agent is preferably employed to provide the aqueous silicone gel wax with a pH preferably from about 6.5 to about 7, to permit the thickener to thicken. Suitable neutralizing agents include conventional bases, such as for example sodium hydroxide, potassium hydroxide and amine containing compound such as triethonolamine, monoethanolamine, lauramine, and cocoamine. The neutralizing agent preferably has from one to sixteen carbon atoms, preferably from 4 to 8 carbon atoms, most preferably 6 carbon atoms. The neutralizing agent has straight chain carbon atoms and at least one amine group. Good results have been obtained employing neutralizer in an amount from about 0.075% to about 0.75%. Preferably the silicone gel wax contains less than 0.3% of the neutralizing agent.

The Polymeric Thickener

For embodiments of the silicon gel protectant in which clarity is not required, polymeric thickeners are suitable. As used herein, the term "polymeric thickener" does not encompass the acrylate thickener. Suitable polymeric thickeners include for example, cellulose gums, acrylic polymers, xanthan gums, and magnesium aluminum silicate are suitable.

The Aminofunctional Silicone

The aminofunctional silicone provides the gloss, durability, and adherence of the silicone gel wax to the underlying surface. The amino-functional silicone preferably has weight average molecular weight from about 800 to about 28,000, more preferably from about 2000 to about 10,000, most preferably from about 4000 to about 5000.

The amino-functional silicone preferably has viscosity of from about 5 to about 1,000 centistokes, more preferably from about 5 to about 100, most preferably from about 10 to about 50 centistokes. The amino-functional silicone preferably has from about 0.1 meq base/g to about 1 meq base/g more preferably from about 0.15 meq base/g to about 0.7 meq base/g, most preferably from about preferably about 0.48 meq/g.

Suitable amino-functional silicones are amine functional silicone siloxane blends, particularly aminoethyl aminopropyl polysiloxane, dimethylpolymers which are methyl silesquioxanes-methoxy terminated, such as Silicone 1706, available from General Electric. Other suitable amino-functional silicones are silicone DC531 available from Dow Corning Company, and Silicone 1708, also available from General Electric Company.

The amino-functional silicones such as Silicone DC 536 from Dow Corning, tend to cloud the composition and are less preferred.

The Silicone Fluid

The silicone fluid is polymeric and is added to increase the viscosity, to enhance rub-out and the durability of the shine in the final appearance of the gel protectant. The silicone fluid is fluid at 20° C., has a weight average molecular weight from about 800 to about 63,000, preferably from about 10,000 to about 30,000, most preferably from about 13,000 to about 28,000, and a viscosity of from about 50 centistokes, to about 10,000 centistokes, preferably from about 300 centistokes to about 1200 v, most preferably 900 to 1,000, centistokes. The silicone fluid is preferably a non-amino silicone fluid. A suitable silicone fluid is a polydimethylsiloxane, having a viscosity of about 1000 centistokes; such a polydimethylsiloxane is available under the trade name "Silicone 200 fluid, 1000 viscosity" from General Electric.

Another suitable, though less preferred silicone fluid, having a molecular weight of about 13,700 and a viscosity of 350, is available as 350 silicone fluid from General Electric.

Optional Ingredients

The Humectant

The humectant, although optional, is highly preferred in both the silicone gel wax and the silicone gel protectant. The humectant is added to the silicone gel wax and to the silicone gel protectant to keep the aminofunctional silicone dispersed, and also to provide clarity to the silicone gel wax. Preferably, the humectant is a straight chain rather than a ring structure and is hygroscopic. Preferably the humectant has 10 or less carbon atoms in the chain. The humectant preferably has from 1 to 5, more preferably from 2 to 3 alcohol groups. Preferably the humectant is a glycol; suitable glycols are, for example, ethylene glycol, and propylene glycol, and glycerin. Glycerin is less preferred.

The Silicone Surfactant

Optionally, though preferably, silicone surfactant is added to both the silicone gel wax and the silicone gel protectant. Silicone surfactants are those organosilane or organosiloxane compounds exhibiting surface active properties. Preferably, the silicone surfactants have a molecular weight of from about 600 to about 10,000, more preferably about 900 to about 6000, most preferably about 3000. Typically, these compounds are composed of condensation products of alkyl-substituted siloxanes, e.g. dimethyl siloxane, copolymerized with condensation products of alkylene oxide, e.g. poly(ethylene oxide). Such compounds are well known in the art. Examples of such compounds are those shown in U.S. Pat. No. 3,299,112, issued to Bailey; U.S. Pat. No. 4,311,695 to Michael S. Starch, issued Jan. 19, 1982; and U.S. Pat. No. 4,782,095, to Mary L. Gum, issued Nov. 1, 1988, the disclosures of which are incorporated herein by reference.

Also, siloxane oligomers described are in U.S. Pat. No. 4,005,028, issued to Heckert et. al. Jan. 25, 1977, the disclosure of which is incorporated herein by reference.

Preferred silicone surfactants for use in the present invention have a weight average molecular weight of from about 500 to 10,000, preferably from about 1,000 to 5,000, most preferably about 3,000, a viscosity at 25° C. of about 20 to 4000 centistokes, preferably 50 to 500 centistokes, more preferably 80 to 200 centistokes and a surface tension at 25° C. in 0.1% concentration in water of 20 to 33, preferably 22 to 30, N/m. Preferred silicone surfactants for use in the present invention are polysiloxane polyethylene glycol copolymers. A suitable polysiloxane polyethylene glycol copolymer silicone surfactant is sold by Wacker Chemical Company of Munich, Germany, under the designation Silicone Fluid L 066.

Another suitable silicone surfactants are oxide modified polydimethylenesiloxanes; suitable silicone surfactants are, for example, polyalkyl alkaline oxide modified polydimethylenesiloxanes. A suitable polyalkylene oxide-modified polydimethylsiloxane block copolymer is available from Osi, under the designation Silwet L 7607, formerly available as Silwet L 7602, CAS No. 68938-54-5, which has a molecular weight of about 3000, an estimated hydrophile-lipophile balance number of about 5 to 8 (as determined by the method of Griffin OFF. Dig.Fed. paint and Varnish Production Clubs, 28, 446 (1956)), a specific gravity of 1.027, flash point of about 260° C., a pour point of about −15° C., an average weight per gallon of 8.54 pounds at 25° C., and an aqueous surface tension of 26.6 Dynes/cm at 0.1% by weight aqueous solution. Another suitable polyalkyl alkaline oxide modified polydimethylenesiloxanes is available under the trade name Silwet 7606 from the OSI Company. Other suitable silicone surfactants are commercially available from Path Silicones, Phoenix Chemical, and General Electric.

The Fluoropolymer

The fluoropolymer, although optional, is preferred. The fluoropolymer imparts slip, longevity, and durability to the silicone gel wax, and to the silicone gel protectant. In the silicone gel protectant, The fluoropolymer preferably has a weight average molecular weight of from about 50,000 to about 200,000, more preferably about 100,000. In the silicone gel protectant, the preferred fluoropolymer is powdered, preferably having a particle size of about 100 microns or less, more preferably less than 1 micron. A suitable fluoropolymer is polytetrafluoroethylene. A suitable polytetrafluoroethylene is available as MP1150 from Dupont. Preferably the fluoropolymer powder is encapsulated in a gel in bead form. Lipo Technologies Inc. prepared polytetrafluoroethylene powder dispersed in silicone 350 and encapsulated in a proprietary gel.

The fluoropolymer employed in the silicone gel wax is preferably an perfluoroalkyl methacrylic copolymer, which is preferably disperseable in water. A suitable perfluoroalkyl methacrylic copolymer is in liquid form and is commercially available as Zonyl 8740 or Zonyl 8607 from DuPont Company.

The Silicone Beads

The silicone beads contribute to the gloss and shine to the silicone gel protectant. Preferably, the silicone beads contain a silicone fluid which is fluid at 20° C., and has a weight average molecular weight from about 800 to about 63,000, preferably from about 10,000 to about 30,000, most preferably from about 13,000 to about 28,000, and a viscosity of from about 50 centistokes, to about 10,000 centistokes, preferably from about 300 centistokes to about 1200 centistokes, most preferably 900 to 1,000, centistokes. The silicone fluid is preferably a non-amino silicone fluid. A suitable silicone fluid has a molecular weight of about 13,700 and a viscosity of 350, is available as 350 silicone fluid from General Electric. A suitable silicone bead, in which the 350 silicone fluid is encased in a gel outer core is commercially available under the designation "nutrient bead" from Lipo Technologies Inc. Such silicone beads have a particle size of 1750 microns, and are dispersed in water.

The Optional Second Aminofunctional Silicone

Preferably, although optionally, a second aminofunctional silicone, having a weight average molecular weight from about 5,000 to about 30,000, more preferably from about 10,000 to about 20,000, most preferably from about 12,000 to about 18,000, is added to the silicone gel wax. The amino-functional silicone preferably has viscosity of from about 1 to about 3,000 centistokes, more preferably from about 100 to about 1,000, most preferably from about 200 to about 500 centistokes. The amino-functional silicone preferably has from about 0.04 meq base/g to about 0.5 meq base/g more preferably from about 0.05 meq base/g to about 0.25 meq base/g, most preferably about 0.15 meq/g. Preferably the second aminofunctional silicone volatilizes from the surface to which it is applied and is non-curable.

A preferred second amino-functional silicone is aminoethyl aminopropyl polysiloxane, having a molecular weight of about 15,203, a viscosity of about 200 to about 500 centistokes, and about 0.15 meq base/g. A suitable aminoethyl aminopropyl polysiloxane and is available under the trade name SF 1921 from General Electric. The SF 1921 is a microemulsion having a continuous phase of silicone in water, and a discontinuous phase of silicone 350. These micro-emulsions may also contain some volatile organic solvents typically less than 1.0% and thus may provide some trace amount of volatile organic solvents to the final formulation of the aqueous silicone gel wax composition; accordingly they are less preferred. The amino-functional silicone is dispersed in the silicone gel wax and does not separate upon standing.

Additional Optional Ingredients

Additional optional ingredients may be added as desired, for example, fungicides, colorants, preservatives, bactericides ultraviolet light absorbers and perfume. A suitable preservative is polymethoxybicyclic oxazolidine, available under the trade name Nuosept C from Costec Inc. Optional ingredients are typically added from 0 to about 20%, preferably from about 0.5% to 20%, more preferably from about 5% to about 10%.

Preferably the silicone gel wax contains less than 0.01% of a salt, particularly sodium chloride. Preferably the gel contains less than 0.5% gum, such as cellulose gum, which provide a sticky formulation that is quite difficult to remove.

As used herein, the phrase "molecular weight" when used in reference to a polymer, refers to weight average molecular weight unless indicated otherwise.

As used herein the term "substantially free of volatile organic solvent" means that there is less than about 5% volatile organic solvents. Volatile organic solvents may be present as a component of the silicones, depending upon the source of the silicones.

Application of the Silicone Gel Wax

The silicone gel wax is evenly applied to the substrate surface such as with a soft cloth and allowed to dry. In the preferred embodiment, when the silicone gel wax dries and forms a light haze, the silicone gel wax is then rubbed out to provide a glossy finish.

Application of the Silicone Gel Protectant

The silicone gel protectant is evenly applied to the substrate surface such as with a soft cotton cloth and allowed to dry. Then the silicone gel protectant was wiped off with a cotton cloth.

All percentages are by weight unless otherwise stated.

EXAMPLE 1

An silicone gel wax having the following formulation was prepared:

| INGREDIENT | AMOUNT |
| --- | --- |
| Water | 35.3% |
| Propylene Glycol | 57% |
| Carbon Carbamer 940 (Acrylic-acrylate thickener in acid form) | 0.3% |
| Triethanolamine | 0.3% |
| GE Silicone, 1706 (amino functional silicone) | 1% |
| Silwet 7607 silicone surfactant | 1% |
| 350 Silicone Fluid | 4% |
| 1000 Silicone Fluid | 0.5% |
| Preservative Nuosept C | 0.4% |
| Perfumes, dye | 0.2% |

The silicone gel wax composition was prepared by first hydrating the carbon Carbamer 940 in the water in a lightening mixer with side sweep blades. The Carbamer and water were mixed thoroughly for about 4 to 5 hours, then the mixture was allowed to settle typically at least 2 to 3 hours. The remaining ingredients were added one after the other, typically within about 5 minutes of each other. Next the propylene glycol was added followed by the triethanolamine. The amino functional silicone, the GE 1706 was added. The 350 and 1000 silicone fluid were added. Finally the preservatives and fragrance were added. The ingredients were mixed slowly so as not to entrap air.

EXAMPLE 2

A silicone gel wax was prepared having the following formulation:

| INGREDIENT | AMOUNT |
|---|---|
| Water | 36.3% |
| Carbon Carbamer 940 (Acrylic-acrylate thickener in acid form) | 0.3% |
| Propylene Glycol | 50% |
| Silwet 7606 silicone surfactant | 0.5% |
| Zonyl 8740 perfluoroalkyl methacrylic copolymer | 0.01% |
| GE Silicone, 1706 (amino functional silicone) | 1% |
| SGSF 1921 optional amino functional silicone (aminoethyl aminopropyl polysiloxane) | 1% |
| Triethanolamine | 0.3% |
| 1000 Silicone fluid | 10% |
| Preservative Nuosept C | 0.4% |
| Perfumes, dye | 0.2% |

The silicone gel wax was prepared as in Example 1, except that the 350 Silicone was not added and the SGSF 1921 aminofunctional silicone was added.

EXAMPLE 3

A silicone gel protectant having the following formulation was prepared:

| INGREDIENT | AMOUNT |
|---|---|
| Water | 38.3% |
| Carbon Carbamer 940 (Acrylic-acrylate thickener in acid form) | 0.2% |
| Propylene Glycol | 50% |
| triethanolamine | 0.2% |
| Silwet 7606 silicone surfactant | 0.5% |
| 1000 Silicone fluid | 10% |
| Preservative Nuosept C | 0.4% |
| PTFE beads | 0.1% |
| Silicone beads | 0.1% |
| Perfumes, dye | 0.2% |

PTFE- polytetrafluoroethylene

The silicone gel protectant was prepared by first hydrating the Carbon Carbomer 940 in the water in a lightening mixer with side sweep blades. Next the propylene glycol was added followed by the triethanolamine. The silicone fluid 1000 was added. Next, the preservatives were added. The Teflon® bead and the silicone beads were added, then the fragrance and dye were added.

Evaluation of Silicone Gel Wax

The silicone gel wax from Examples 1–2 was applied by hand using a soft cloth or sponge to various portions the painted surface of an exterior of an new, red, automobile. The silicone gel wax was allowed to dry, then buffed with a clean cloth. For comparison, conventional liquid waxes were applied to other surfaces.

After the silicone gel wax was applied, an initial gloss measurement were determined as 90–95% gloss from the surface at a 60° angle using a BYK gloss meter from the BYK Company, according to the manufacturer's instructions.

Water was applied to the car; the water formed discrete, tight beads on the areas to which the silicone car wax had been applied.

After the initial gloss reading was taken, the car was subjected to multiple washes in a commercial "brushless" car wash which employed warm water, about 110° C. water and floppy rubber belts rather than brushes to clean the car. Intermittent gloss readings were taken as indicated in Table 1.

TABLE 1

Gloss measurements for Silicone Gel Wax

|  | Initial Gloss | Gloss after 5 washes | Gloss after 10 washes | Gloss after 15 washes | Gloss after 20 washes |
|---|---|---|---|---|---|
| Trunk with Gel Wax | 92.7 | 90 | 88.9 | 89.6 | 89.6 |
|  | Initial | 5× | 10× | 15× | 20× |
| Hood with Gel Wax | 91.6 | 89.4 | 89.4 | 87.6 | 87 |
| Roof with Gel Wax | 89.6 | 89.5 | 89.9 | 88.8 | 87.8 |

The gloss readings in Table 1 indicate that after 20 washes there is virtually no change, less than 5% in the gloss values as compared to the initial gloss. areas which received the silicone gel wax comparison with areas had a higher gloss than areas which had received conventional liquid.

Aqueous silicone gel wax from Examples 1–2 was also applied by hand using a soft cloth or sponge to 15 (3"×6") coated steel panels having painted surface of automotive paint. The silicone gel wax was allowed to dry, then buffed with a clean cloth. For comparison, conventional wax products were applied to control panels. The panels were subjected to about 1008 hours of accelerated weathering. The results are shown below in table 2.

The metal panels were exposed to QUV accelerated weathering re-exposure using UVA-340 lamps in cycles of 8 hours UV light at 60° C., and 4 hours condensation at 50° C., for 1008 hours. Gloss was measured at 60° and 20°.

|  | 60° Gloss | | | 20° Gloss | | | Surface |
|---|---|---|---|---|---|---|---|
| Specimen No. | O | P | Δ | O | P | Δ | Tension |
| 0 Weeks Initial Readings Comparative Products | | | | | | | |
| A1 | 88 | | | | | | 10 |
| 2 | 95 | | | | | | 10 |
| 3 | 93 | | | | | | 10 |
| B1 | 95 | | | | | | 10 |
| 2 | 93 | | | | | | 10 |
| 3 | 95 | | | | | | 10 |
| C1 | 94 | | | | | | 10 |
| 2 | 93 | | | | | | 10 |

| Specimen No. | 60° Gloss | | | 20° Gloss | | | Surface Tension |
|---|---|---|---|---|---|---|---|
| | O | P | Δ | O | P | Δ | |
| 3 | 94 | | | | | | 10 |
| D1 | 94 | | | | | | 10 |
| 2 | 91 | | | | | | 10 |
| 3 | 94 | | | | | | 10 |
| silicone gel wax | | | | | | | |
| E1 | 94 | | | | | | 10 |
| 2 | 96 | | | | | | 10 |
| 3 | 95 | | | | | | 10 |
| Week 1 Comparative Products | | | | | | | |
| A1 | 93 | 93 | 0 | 83 | 83 | 0 | 10 |
| 2 | 95 | 94 | 1 | 92 | 86 | 6 | 10 |
| 3 | 95 | 95 | 0 | 89 | 89 | 0 | 10 |
| B1 | 94 | 93 | 1 | 89 | 88 | 1 | 10 |
| 2 | 95 | 94 | 1 | 92 | 86 | 6 | 10 |
| 3 | 95 | 94 | 1 | 83 | 83 | 0 | 10 |
| C1 | 96 | 92 | 4 | 90 | 88 | 2 | 10 |
| 2 | 95 | 94 | 1 | 87 | 85 | 2 | 10 |
| 3 | 94 | 92 | 2 | 87 | 82 | 5 | 10 |
| D1 | 94 | 94 | 0 | 90 | 87 | 3 | 10 |
| 2 | 95 | 93 | 2 | 87 | 83 | 4 | 10 |
| 3 | 94 | 92 | 2 | 86 | 84 | 2 | 10 |
| silicone gel wax | | | | | | | |
| E1 | 91 | 90 | 1 | 75 | 74 | 1 | 10 |
| 2 | 95 | 95 | 0 | 93 | 84 | 9 | 10 |
| 3 | 95 | 95 | 0 | 91 | 85 | 6 | 10 |
| Week 2 Comparative Products | | | | | | | |
| A1 | 93 | 91 | 2 | 83 | 82 | 1 | 9 |
| 2 | 95 | 93 | 2 | 92 | 84 | 8 | 9 |
| 3 | 95 | 93 | 2 | 89 | 83 | 6 | 9 |
| B1 | 94 | 91 | 3 | 89 | 83 | 6 | 9 |
| 2 | 95 | 92 | 3 | 92 | 86 | 6 | 9 |
| 3 | 95 | 92 | 3 | 92 | 86 | 6 | 9 |
| C1 | 96 | 91 | 5 | 90 | 75 | 15 | 9 |
| 2 | 95 | 92 | 3 | 87 | 84 | 3 | 9 |
| 3 | 94 | 90 | 4 | 87 | 75 | 12 | 9 |
| D1 | 94 | 93 | 1 | 90 | 86 | 4 | 9 |
| 2 | 95 | 92 | 3 | 87 | 79 | 8 | 9 |
| 3 | 94 | 91 | 3 | 86 | 86 | 0 | 9 |
| silicone gel wax | | | | | | | |
| E1 | 91 | 87 | 4 | 75 | 72 | 3 | 9 |
| 2 | 95 | 92 | 3 | 83 | 82 | 11 | 9 |
| 3 | 95 | 83 | 2 | 91 | 86 | 5 | 9 |
| Week 3 Comparative Products | | | | | | | |
| A1 | 93 | 93 | 0 | 83 | 87 | -4 | 9 |
| 2 | 95 | 94 | 1 | 92 | 85 | 7 | 9 |
| 3 | 95 | 95 | 0 | 89 | 84 | 5 | 9 |
| B1 | 94 | 91 | 3 | 89 | 86 | 3 | 9 |
| 2 | 95 | 94 | 1 | 92 | 89 | 3 | 9 |
| 3 | 95 | 93 | 2 | 83 | 82 | 1 | 9 |
| C1 | 96 | 94 | 2 | 90 | 85 | 5 | 9 |
| 2 | 95 | 94 | 1 | 87 | 84 | 3 | 9 |
| 3 | 94 | 92 | 2 | 87 | 74 | 13 | 9 |
| D1 | 94 | 95 | -1 | 90 | 87 | 3 | 9 |
| 2 | 95 | 923 | 3 | 87 | 88 | 1 | 9 |
| 3 | 94 | 93 | 1 | 86 | 85 | 1 | 9 |
| silicone gel wax | | | | | | | |
| E1 | 91 | 91 | 0 | 75 | 70 | 5 | 9 |
| 2 | 95 | 95 | 0 | 93 | 81 | 12 | 9 |
| 3 | 95 | 94 | 1 | 91 | 84 | 7 | 9 |
| Week 4 Comparative Products | | | | | | | |
| A1 | 93 | 92 | 1 | 83 | 83 | 0 | 7 |
| 2 | 95 | 93 | 2 | 92 | 84 | 8 | 7 |
| 3 | 95 | 94 | 1 | 89 | 84 | 5 | 7 |
| B1 | 94 | 92 | 2 | 89 | 89 | 82 | 7 |
| 2 | 95 | 93 | 2 | 92 | 82 | 10 | 7 |
| 3 | 95 | 92 | 3 | 83 | 78 | 5 | 7 |
| C1 | 96 | 91 | 5 | 90 | 81 | 9 | 7 |
| 2 | 95 | 93 | 2 | 87 | 83 | 4 | 7 |
| 3 | 94 | 81 | 3 | 87 | 73 | 14 | 7 |
| D1 | 94 | 93 | 1 | 90 | 82 | 8 | 7 |
| 2 | 95 | 90 | 5 | 87 | 80 | 7; | 7 |
| 3 | 94 | 90 | 4 | 86 | 84 | 2 | 7 |
| silicone gel wax | | | | | | | |
| E1 | 91 | 87 | 4 | 75 | 65 | 9 | 7 |
| 2 | 95 | 92 | 3 | 93 | 82 | 11 | 7 |
| 3 | 95 | 93 | 2 | 91 | 85 | 6 | 7 |
| Week 5 Comparative Products | | | | | | | |
| A1 | 93 | 92 | 1 | 83 | 80 | 3 | 5 |
| 2 | 95 | 93 | 2 | 92 | 79 | 13 | 5 |
| 3 | 95 | 93 | 2 | 89 | 82 | 7 | 5 |
| B1 | 94 | 92 | 2 | 89 | 79 | 10 | 5 |
| 2 | 95 | 92 | 3 | 92 | 80 | 12 | 5 |
| 3 | 95 | 92 | 3 | 83 | 78 | 5 | 5 |
| C1 | 98 | 90 | 6 | 90 | 79 | 11 | 5 |
| 2 | 95 | 90 | 5 | 87 | 74 | 13 | 5 |
| 3 | 94 | 89 | 5 | 87 | 68 | 19 | 5 |
| D1 | 94 | 92 | 2 | 90 | 82 | 8 | 5 |
| 2 | 95 | 90 | 5 | 87 | 80 | 7 | 5 |
| 3 | 94 | 89 | 5 | 86 | 81 | 5 | 5 |
| silicone gel wax | | | | | | | |
| E1 | 91 | 87 | 4 | 75 | 64 | 11 | 5 |
| 2 | 95 | 82 | 3 | 93 | 80 | 13 | 5 |
| 3 | 95 | 93 | 2 | 91 | 82 | 9 | 5 |
| Week 6 Comparative Products | | | | | | | |
| A1 | 93 | 92 | 1 | 83 | 80 | 9 | 5 |
| 2 | 95 | 93 | 2 | 92 | 80 | 12 | 5 |
| 3 | 95 | 81 | 14 | 89 | 74 | 15 | 5 |
| B1 | 94 | 82 | 2 | 89 | 90 | 9 | 5 |
| 2 | 95 | 92 | 3 | 92 | 80 | 12 | 5 |
| 3 | 95 | 92 | 3 | 83 | 70 | 13 | 5 |
| C1 | 96 | 92 | 4 | 90 | 75 | 15 | 5 |
| 2 | 95 | 92 | 3 | 83 | 77 | 10 | 5 |
| 3 | 94 | 89 | 5 | 87 | 69 | 18 | 5 |
| D1 | 94 | 92 | 2 | 90 | 79 | 11 | 5 |
| 2 | 96 | 80 | 15 | 87 | 76 | 12 | 5 |
| 3 | 94 | 91 | 3 | 86 | 82 | 4 | 5 |
| silicone gel wax | | | | | | | |
| E1 | 91 | 86 | 5 | 75 | 82 | 13 | 5 |
| 2 | 95 | 94 | 1 | 93 | 78 | 15 | 5 |
| 3 | 95 | 93 | 2 | 91 | 81 | 10 | 5 |

The silicone gel wax has been described as being a protectant for automobile paint, it is to be understood that it is also a suitable protectant for other painted finishes particularly such surfaces that are subjected to the weather and sunlight.

Evaluation of the Silicone Gel Protectant

The silicone gel protectant from example 3, was applied to portions of the vinyl and rubber surfaces on the interior and exterior of a new automobile. For comparison, a conventional "protectant" was also applied on portions of the vinyl and rubber surfaces on the interior and exterior of the automobile. The silicone gel wax was inspected visually. The silicone gel wax left a satin finish. In contrast, the conventional protectant appeared greasy, and left a visible mark when a finger was drawn across the surface. The silicone gel wax did not leave a visible mark when a finger was drawn across the surface.

Although one embodiment of this invention has been shown and described, various adaptations and modifications can be made without departing from the scope of the invention as defined in the appended claims.

What is claimed is:

1. A silicone gel wax for protecting surface finishes comprising:

from about 0.01% to about 15%, of an amino-functional silicone;

from about 0.05% to about 3%, of an acrylate thickener;

from about 25% to about 80% water;

from about 0.01% to about 20% silicone fluid;

from 0% to about 80% humectant;

from 0% to about 25% silicone surfactant; and from 0% to about 10% fluoropolymer, wherein the silicone gel wax has a viscosity of at least about 3000 centipoise.

2. The silicone gel wax of claim 1, wherein the silicone surfactant is present from about 0.1% to about 25% and the humectant is present from about 0.1% to about 80%.

3. The silicone gel wax of claim 2, wherein: the humectant is a glycol; the acrylate thickener is polyacrylic acid; the aminofunctional silicone has a molecular weight of from about 800 to about 28,000; and the silicone fluid has a molecular weight of from about 800 to about 63,000 and a viscosity of from about 50 to about 10,000 ctks.

4. The silicone gel wax of claim 3, wherein the silicone gel wax has less than 10% volatile organic solvents.

5. The silicone gel wax of claim 1, wherein the silicone gel wax comprises:

from about 0.1% to about 8%, of the amino-functional silicone;

from about 0.1% to about 1%, of the acrylate thickener;

from about 25% to about 50% water;

from about 10% to about 70 of the humectant, wherein the humectant is a glycol;

from about 0.1% to about 15% of the silicone fluid;

from about 0.5% to about 8% of the silicone surfactant;

from about 0.001% to about 10% of the fluoropolymer, wherein the silicone gel wax has a viscosity of at least about 5000 cps.

6. The silicone gel wax of claim 5, wherein:

the thickener is an acrylic-acrylate and has a equivalent weight of from about 72 to 80, and weight average molecular weight, in water, of greater than about 400,000;

the amino-functional silicone has weight average molecular weight from about 2000 to about 10,000 and a viscosity of about 5 to about 100 centistokes;

the silicone fluid has a weight average molecular weight from about 10,000 to about 30,000, and a viscosity of from about 300 centistokes to about 1200 centistokes;

the humectant is selected from the group consisting of: ethylene glycol, propylene glycol, glycerin and mixtures thereof.

7. The silicone gel wax of claim 1, wherein the silicone gel wax comprises:

from about 0.5% to about 3%, of the amino-functional silicone, wherein the amino-functional silicone is has a weight average molecular weight if from about 2,000 to about 10,000, selected from the group consisting of: aminoethyl aminopropyl polysiloxane, methyl silesquioxanes-methoxy terminated dimethylpolymers and mixtures thereof;

from about 0.2% to about 0.5%, of the acrylate thickener wherein the acrylate thickener has a weight average molecular weight greater than about 400,000;

from about 53% to about 61% of the humectant, wherein the humectant is selected from the group consisting of: ethylene glycol, propylene glycol, glycerin and mixtures thereof;

from about 2% to about 12% of the silicone fluid wherein the silicone fluid is polydimethylsiloxane;

from about 0.1% to about 3% of the silicone surfactant; and having a molecular weight of from about 600 to about 10,000;

from about 0.01% to about 3% fluoropolymer;

wherein the silicone gel wax has a viscosity of at least about 5000 cps.

8. The silicone gel wax of claim 7, wherein:

the thickener is carboxypolymethylene, having an equivalent weight of from about 75 to about 77 and weight average molecular weight of greater than about 500,000;

the amino-functional silicone is methyl silesquioxanes-methoxy terminated dimethylpolymer, having weight average molecular weight from about 4000 to about 5000, and a viscosity of from about 10 to 50, and about 0.15 meq base/g;

the silicone fluid is polydimethylsiloxane and has a weight average molecular weight from about 13,000 to about 28,000, and a viscosity of from about 900 ctks to about 1000 ctks;

the fluoropolymer is perfluoroalkyl methacrylic copolymer;

the silicone surfactant is a polysiloxane polyethylene glycol copolymer; and the glycol is propylene glycol.

9. The silicone gel wax of claim 8, wherein humectant and the water are present in a ratio of from about 2.5:1 to 0.5:1.

10. The silicone gel wax of claim 1, wherein the silicone gel wax comprises:

about 1% aminofunctional silicone wherein the amino functional silicone is methyl silesquioxanes-methoxy terminated dimethylpolymer;

about 0.3%, of the polymeric thickener wherein the thickener is carboxypolymethylene;

about 35% water;

about 57% of the humectant, wherein the humectant is a propylene glycol;

about 4.5% of the silicone fluid wherein the silicone fluid is a mixture of a polydimethylsiloxane having a viscosity of about 1000 centistokes and a polydimethylsiloxane having a viscosity of about 350 centistokes;

about 1% of the silicone surfactant, wherein the silicone surfactant is polyalkyl alkaline oxide modified polydimethylenesiloxane;

further comprising about 0.3% triethanolamine, wherein the silicone gel wax has a viscosity of from about 50,000 to about 60,000 cps and is transparent.

11. The silicone gel wax of claim 1, wherein the silicone gel wax comprises:
about 1% aminofunctional silicone wherein the amino functional silicone is methyl silesquioxanes-methoxy terminated dimethylpolymer;
from about 0.1% to about 1%, of the polymeric thickener wherein the thickener is carboxypolymethylene;
about 36% water;
about 50% of the humectant, wherein the humectant is a propylene glycol;
about 10% of the silicone fluid wherein the silicone fluid is polydimethylsiloxane having a viscosity of about 1000 centistokes;
about 0.5% of the silicone surfactant, wherein the silicone surfactant is polyalkyl alkaline oxide modified polydimethylenesiloxane;
about 0.01% of the fluoropolymer, where the fluoropolymer is perfluoroalkyl methacrylic copolymer;
further comprising:
about 0.3% triethanolamine,
about 1% aminoethyl aminopropyl polysiloxane, having a molecular weight of about 15,203, a viscosity of about 200 to about 500 centistokes, and about 0.15 meq base/g.,
wherein the silicone gel wax has a viscosity of from about 50,000 to about 60,000 cps and is transparent.

12. A silicone gel protectant comprising:
from about 0.01% to about 20%, of an silicone fluid;
from about 0.01% to about 15% of a thickener;
from about 20% to about 80% water;
from about 0% to about 80% humectant;
from about 0% to about 20% silicone surfactant; and
from 0% to about 10% fluoropolymer;
wherein the silicone gel protectant has a viscosity of at least 1000 cps.

13. The silicone gel protectant of claim 12, wherein the silicone surfactant is present from about 0.01% to about 20% and the humectant is present from about 0.1 to about 80%.

14. The silicone gel protectant of claim 13, wherein the humectant is a glycol, the thickener is an acrylic-acrylate, the silicone fluid has a molecular weight of from about 800 to about 63,000 cps and a viscosity of from about 50 to 10,000 centistokes.

15. The silicone gel protectant of claim 14, wherein the silicone gel protectant has less than 10% volatile organic solvents.

16. The silicone gel protectant of claim 12, wherein the silicone gel protectant comprises:
from about 0.05% to about 10%, of the thickener, wherein the thickener is an acrylate thickener;
from about 25% to about 65% water;
from about 10% to about 70% of the humectant, wherein the humectant is a glycol;
from about 0.1% to about 15% of the silicone fluid;
from about 0.05% to about 10% of the silicone surfactant;
wherein the silicone gel protectant has a viscosity of at least about 5000.

17. The silicone gel protectant of claim 16, wherein:
the thickener is an acrylic-acrylate and has a equivalent weight of from about 72 to 80, and weight average molecular weight, in water, of greater than about 400,000;
the silicone fluid has a weight average molecular weight from about 10,000 to about 30,000, and a viscosity of from about 300 centistokes to about 1200 centistokes;
the humectant is selected from the group consisting of: ethylene glycol, propylene glycol, glycerin and mixtures thereof.

18. The silicone gel protectant of claim 12, wherein the silicone gel protectant comprises:
from about 0.1% to about 1%, of the thickener wherein the thickener is an acrylate thickener having a weight average molecular weight of greater than about 400,000;
from about 30% to about 45% water;
from about 25% to about 65% of the humectant, wherein the humectant is selected from the group consisting of: ethylene glycol, propylene glycol, glycerin and mixtures thereof;
from about 5% to about 12% of the silicone fluid wherein the silicone fluid is a polydimethylsiloxane;
from about 0.1% to about 3% of the silicone surfactant, wherein the silicone surfactant having a weight average molecular weight of from about 600 to 10,000;
from about 0.001% to about 10% of the fluoropolymer;
wherein the silicone gel protectant has a viscosity of from about 1,000 to about 20,000 cps.

19. The silicone gel protectant of claim 18, wherein:
the thickener is carboxypolymethylene, having an equivalent weight of from about 75 to about 77 and weight average molecular weight of greater than about 500,000;
the silicone fluid is polydimethylsiloxane and has a weight average molecular weight from about 13,000 to about 28,000, and a viscosity of from about 900 centistokes to about 1000 centistokes;
the fluoropolymer is polytetrafluorethylene;
the silicone surfactant is a polysiloxane polyethylene glycol copolymer; and
the glycol is propylene glycol.

20. The silicone gel protectant of claim 14, wherein the silicone gel protectant has less than 5% volatile organic solvents.

21. A silicone gel protectant of claim 12, wherein the silicone gel protectant comprises:
about 1%, of the thickener wherein the thickener is carboxypolymethylene;
about 38% water;
about 50% of the humectant, wherein the humectant is a propylene glycol;
about 10% of the silicone fluid wherein the silicone fluid is polydimethylsiloxane having a weight average molecular weight of about 1000 centistokes;
about 0.5% of the silicone surfactant, wherein the silicone surfactant is polyalkyl alkaline oxide modified polydimethylenesiloxane;
further comprising about 0.1% silicone beads, about 0.1% polytetrafluoroethylene beads, and 0.2% triethanolamine,
wherein the silicone gel protectant has a viscosity of from about 3500 to about 4500 cps and is transparent.

22. A method of protecting surface finish comprising the following steps:
applying a silicone gel wax to the surface, said silicone gel wax comprising:
from about 0.01% to about 15%, of an aminofunctional silicone;
from about 0.05% to about 3%, of an acrylate thickener;

from about 25% to about 80% water;
from about 0.01% to about 20% silicone fluid;
from 0% to about 80% humectant;
from 0% to about 25% silicone surfactant; and
from 0% to about 10% fluoropolymer;
wherein the silicone gel wax has a viscosity of at least about 3000.

23. The method of claim 21, wherein the silicone gel wax has less than 10% volatile organic solvents and the surface is painted metal.

24. A method of protecting a surface comprising the following steps:
applying to the surface, a silicone gel protectant comprising:
from about 0.01% to about 20%, of an silicone fluid;
from about 0.01% to about 15% of a polymeric thickener;
from about 20% to about 80% water;
from about 0% to about 80% humectant;
from about 0% to about 20% silicone surfactant; and
from 0% to about 10% polytetrafluoroethylene;
wherein the silicone gel protectant has a viscosity of at least 1000 cps.

25. The method of claim 24, wherein the silicone gel protectant has less than 10% volatile organic solvents and the surface is leather, vinyl, plastic or rubber.

26. The silicone gel wax of claim 7, wherein the water is present from about 30% to about 38%.

* * * * *